United States Patent [19]

Ogawa et al.

[11] 3,792,262

[45] Feb. 12, 1974

[54] SCANNING INITIATION POSITION DETECTING DEVICE

[75] Inventors: Mutsuo Ogawa, Tokyo; Yoshiaki Satake, Sagamihara, both of Japan

[73] Assignee: Ricoh Co., Ltd., Tokyo, Japan

[22] Filed: Nov. 22, 1972

[21] Appl. No.: 308,928

[30] Foreign Application Priority Data

Nov. 25, 1971 Japan .............................. 46/110461

[52] U.S. Cl. ........................ 250/223 R, 250/219 DC

[51] Int. Cl. ............................................ G01b 7/04

[58] Field of Search 250/219 DC, 221, 222 R, 223 R, 250/219 DQ, 219 LG, 217 R

[56] References Cited

UNITED STATES PATENTS 3,452,208 6/1969 Giltinan .............................. 250/218

3,321,637 5/1967 Beltz et al. ............... 250/219 DC X 3,454,777 7/1969 Marcus ................... 250/219 DD X 3,480,762 11/1969 Del Vecchio ........... 250/219 DC X 3,578,315 5/1971 Milford .................... 250/219 DC X

*Primary Examiner*—Walter Stolwein

*Attorney, Agent, or Firm*—Cooper, Dunham, Clark, Griffin & Moran

[57] ABSTRACT

A device comprising a light source disposed on the upper or under side of a slit formed in an original support table and vertically spaced apart therefrom, and two photoelectric transducer elements disposed on the other side of the slit and vertically spaced apart therefrom, the transducer elements being arranged such that light from the same portion of the light source is incident upon them and one of them serving as a detecting element while the other serves as a reference element. As an original is fed to the original supply table, the position at which scanning of the original is initiated is detected accurately and positively irrespective of variations in the types of originals and irregularities in the intensity of light from the light source.

10 Claims, 3 Drawing Figures

SCANNING INITIATION POSITION DETECTING DEVICE

BACKGROUND OF THE INVENTION

This invention relates to a scanning initiation position detecting device for use with an original scanning device adapted to scan, by light from a light source, many types of originals where light transmitting property may vary from one another.

In apparatus, such for example as facsimile transmitters, for transmitting information by scanning originals, it is essential that the position at which scanning of the image of an original is initiated the ascertained before information transmission is commenced. If this requirement is not met, there may arise a gap in the information transmitted.

In one means for detecting the scanning initiation position, a light source and a photoelectric transducer element are respectively disposed on opposite sides of a slit formed in a guide plate on which the original sheet moves, and a variation in the output power of the photoelectric transducer element, which may be produced when scanning of the original sheet is initiated, is amplified to produce a detection pulse.

In facsimile transmitters, originals to be handled vary in quality, thickness and type unlike originals handled by information card readout devices. Consequently, the originals handled may vary from one another in light transmitting property.

The light source which may be used concurrently as a light source for information read-out is generally elongated. This type of light source has the disadvantages of the intensity of light emanating therefrom varying from portion to portion of the source and being reduced with time. When the old light source is replaced by a new one, the condition also changes. Thus, it is not possible, when only one photoelectric transducer element is used, to detect accurately the scanning initiation position because the output power of the transducer elements show changes at all times.

SUMMARY OF THE INVENTION

This invention has as its object the provision of a scanning initiation position detecting device adapted for use with an original scanning device for facsimile transmitters or the like wherein a photoelectric transducer element serving as a comparison element or reference element is used in addition to the photoelectric transducer element serving as a detection element, and light from the same portion of the light source is caused to be incident on the two photoelectric transducer elements whereby the aforementioned disadvantages of the prior art can be obviated.

The device according to the invention offers many advantages. Since light from the same portion of the light source is incident on the two photoelectric transducer elements for scanning information on the original, the scanning operation is not affected at all by the fatigue of the light source, whether the light source is old or new or whether there are variations in the intensity of light in various portions of the elongated light source. The device permits the scanning initiation position to be detected automatically in spite of the fact that the original has a large thickness and is consequently low in light transmitting property or it is made of a relatively transparent material and consequently has a high light transmitting property.

DESCRIPTION OF A PREFERRED EMBODIMENT

Figure 1:
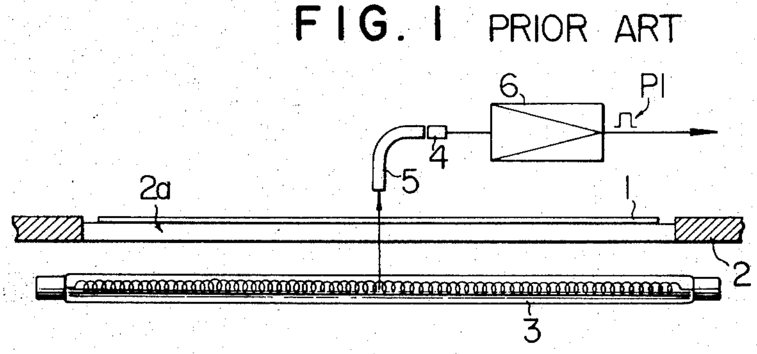
FIG. 1 PRIOR ART
FIG. 1 is a schematic view of one example of scanning initiation position detecting devices of the prior art.

In a prior art device for detecting the scanning initiation position, illustrated in FIG. 1, a slit 2*a* is formed and disposed across a guide plate 2 on which an original 1 is moved as shown in FIG. 1, and a light source 3 is arranged on one side of slit 2*a* (below as shown) while a light introducing portion 5 of a photoelectric transducer element 4 serving as a detecting element is arranged on the other side thereof (above as shown). A variation in the output power of photoelectric transducer element 4 which may be produced when scanning of the original is initiated is supplied to an amplifier 6 to produce a detection pulse P1 therefrom.

The present invention will now be described with reference to an embodiment shown in FIG. 2 in which an original 7 is moved on an original support portion 8*a* of a guide plate 8 which is formed therein with a slit S of a width slightly larger than the width of original 7. A light source 9, which may be an elongated halogen lamp or fluorescent light lamp and which may serve concurrently as a light source for read-out of information, is disposed on one side of slit S (below as shown). Disposed on the other side of slit S are a light introducing portion 11 of a photoelectric transducer element 10 serving as a detection element and a light introducing portion 13 of a photoelectric transducer element 12 serving as a reference element. The two light introducing portions 11 and 13 are each made of a photoconductive material, such for example as a glass plate or glass fiber, and have light incident end surfaces 11*a* and 13*a* respectively which face a portion A of light source 9. The light introducing portions 11 and 13 face directions which are disposed substantially at right angles to the path of travel of the original. It is to be understood that the light receiving portions of photoelectric transducer elements 11 and 13 may be arranged to be juxtaposed to light source 9 by eliminating the two light introducing portions 11 and 13.

Output signals of the two photoelectric transducer elements 10 and 12 are supplied to a detection signal generator 14 to be compared and amplified therein. When the output power of photoelectric transducer element 10 serving as a detection element is reduced, though slightly, below the output power of photoelectric transducer element 12 serving as a reference element as a result of introduction of original 7 into the scanning position, a detection signal P2 is produced. A reduction in intensity of light due, for example, to the distance between the portion A of light source 9 and the light incident surfaces of photoelectric transducer elements 10 and 12 may be suitably compensated for by adjusting generator 14.

Figure 2:
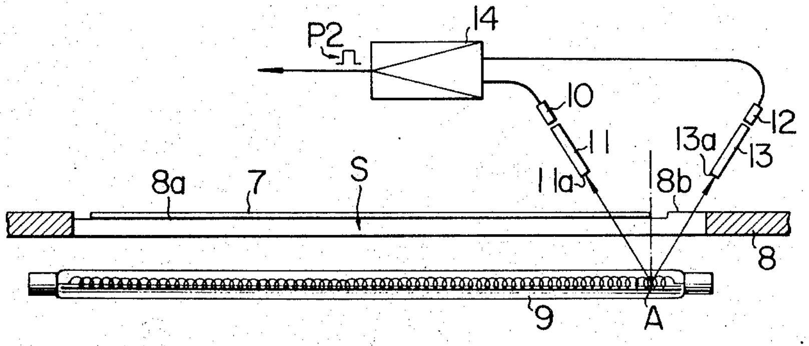
FIG. 2 is a schematic view of the scanning initiation position detecting device for an original scanning device comprising one embodiment of the invention.

In FIG. 2, an offset portion 8b is formed in guide plate 8 and disposed at a level (as shown) different from the level of original support portion 8*a*. It is to be understood that the offset portion may be eliminated so as to place the original support portion at the same level as the rest of the guide plate. Also, photoelectric transducer elements 10 and 12 and their light introducing portions 11 and 13 respectively may be arranged in side-by-side relationship along the path of travel of original 7. When this is the case, offset portion 8b may also be eliminated and the width of slit S may be reduced correspondingly so that slit S may have substantially the same width as original 7.

Signal P2 produced in this device may be of any form. For example, it may be in the form of a rectangular pulse or a so-called prohibition signal in the form of a continuously produced pulse the absence of which prohibits scanning of an original to be performed. Detection signal generator 14 may be of any form and comprise a well-known bridge circuit, amplifier or the like. The light source has been described as being used concurrently for read-out of information, but may be used exclusively for detecting the scanning initiation position.

Figure 3:
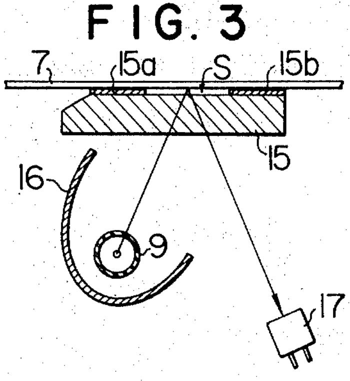
FIG. 3 shows the manner in which read-out of information is performed by means of the light source.

FIG. 3 shows the manner in which read-out of information is performed by means of light source 9.

Shield members 15a and 15b are disposed on the upper surface of an original rest table 15 made as of transparent glass. A slit S is formed between two members 15a and 15b by slightly spacing them apart. Shield members 15a and 15b may be provided on the upper surface or lower surface of table 15 by applying or vapor deposition in vacuum of a metal or pasting of an opaque material. Slit S may also be formed by holding glass between two opaque members.

A reflecting shade 16 comprising an ellipsoid mirror or the like is disposed at the back of light source 9 to collect light from the light source and directing the same toward the underside of original 7 moved on slit S. Light reflected by original 7 is incident on a plurality of photoelectric transducer elements 17 disposed on the same side of the original sheet as light source 9 for effecting information read-out.

What is claimed is:

1. A scanning initiation position detecting device adapted for use with an original sheet scanning device for scanning various types of original sheets varying from one another in light transmitting property, said device comprising:

*a.* an elongated light source disposed on one side of a path of travel of an original sheet,

*b.* a photoelectric transducer element serving as a detection element and having a light introducing portion disposed opposite said light source with respect to the path of travel of the original sheet and juxtaposed to one predetermined portion of said light source, said light introducing portion of said first-mentioned photoelectric transducer element being disposed and adapted to receive light transmitted from said predetermined portion of said light source along a light path intersecting said path of travel when there is no original sheet on the path of travel such that occlusion of said light path by an original sheet on the path of travel reduces the light received by said first-mentioned photoelectric transducer element;

*c.* a photoelectric transducer element serving as a reference element and having a light introducing portion disposed outside said path of travel and juxtaposed to said one predetermined portion of said light source, said light introducing portion of said last-mentioned photoelectric transducer element being adapted to receive light direct from said predetermined portion of said light source; and

*d.* detection signal producing means for comparing the output of said photoelectric transducer element serving as a reference element with the output of said photoelectric transducer element serving as a detection element and producing a detection signal in response to a change in the relative magnitude of the outputs of the two phototransducer elements.

2. A device as set forth in claim 1 wherein said light introducing portion of said phototransducer element serving as a reference element and said light introducing portion of said phototransducer element serving as a detection element face directions which are disposed substantially at right angles to the direction of movement of the original sheet.

3. A device set forth in claim 1 wherein said phototransducer element serving as a reference element and said photoelectric transducer element serving as a detection element are disposed on the same side with respect to the direction of movement of the original sheet.

4. A device as set forth in claim 1 including means defining a slit across which said path of travel extends, and wherein light from said light source is incident on the original sheet through said slit.

5. A device as set forth in claim 4 wherein said slit-defining means comprises an original support table, said slit splitting said table.

6. A device as set forth in claim 4 wherein said slit-defining means comprises a transparent member bearing a coat of opaque material, a portion of the transparent body being uncovered with the coat of opaque material to constitute the slit.

7. A device as set forth in claim 1 wherein said light source serves concurrently as a light source for read-out of an original sheet.

8. In apparatus for initiating scanning of an original sheet advancing along a defined path of travel, in combination,

*a.* means for defining a path of travel for an original sheet;

*b.* an elongated light source for illuminating a portion of the path of travel;

*c.* first phototransducer means for producing an electrical output proportional to the level of light received thereby, disposed to receive light radiating from a predetermined portion of said light source along a light path extending through said path of travel in the absence of an original sheet in said path of travel such that arrival of an original sheet in position for initiation of scanning in said path of travel occludes said light path and thus reduces the level of light received by said first phototransducer means, as compared with the level of light received thereby absent an original sheet in said path of travel;

*d.* second phototransducer means for producing an electrical output proportional to the level of light received thereby, disposed to receive light radiating from the same predetermined portion of said light source along a second light path that is not occluded by an original sheet arriving in scanning-initiation position as aforesaid so that arrival of an original sheet in said scanning-initiation position does not reduce the level of light received by said second phototransducer means;

*e.* means for receiving and comparing the outputs of said first and second phototransducer means and for producing a control signal representative of a change in the relative magnitude of said outputs as representative of arrival of an original sheet in said scanning initiation position; and

*f.* means for scanning an original sheet in said path of travel in response to production of a signal by said signal-producing means.

9. Apparatus as defined in claim 8, wherein said first and second phototransducer means are disposed and adapted to produce outputs of identical magnitude when there is no original sheet in said path of travel.

10. Apparatus as defined in claim 8, further including a table for supporting an original sheet advancing along said path of travel, and having formed therein a light-transmissive slit extending transversely of said path of travel, wherein said light source is an extended light source disposed on one side of said table in parallel relation to said slit for directing light therethrough, and wherein said first and second phototransducer means are disposed on the other side of said table and oriented for scanning the same predetermined portion of said light source through said slit in such respective positions that light from said predetermined portion of said light source radiates to said first phototransducer means through said path of travel and to said second phototransducer means through a portion of said slit external to said path of travel.

* * * * *